Figure 1:
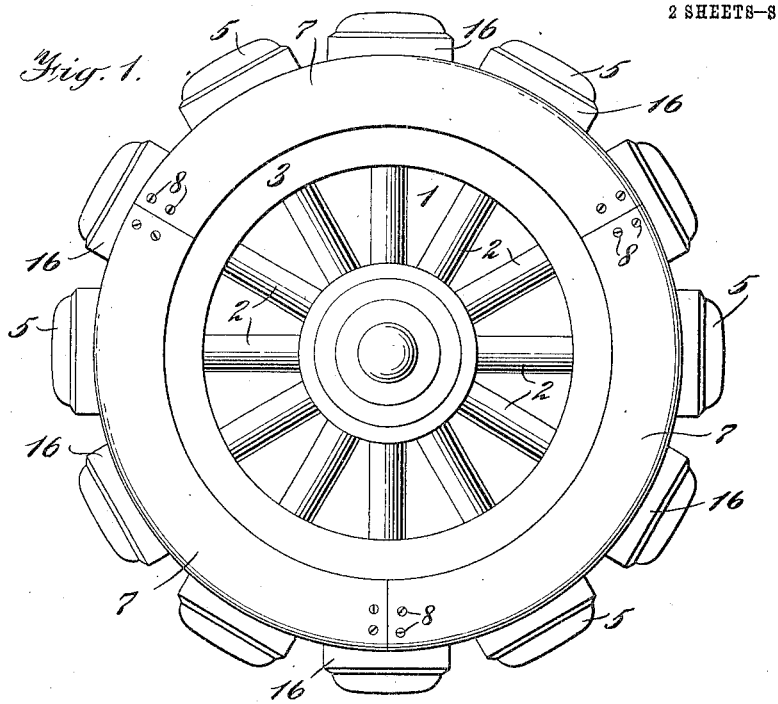

P. B. DAWSON.
VEHICLE TIRE.
APPLICATION FILED NOV. 22, 1911.

1,089,116.

Patented Mar. 3, 1914.

2 SHEETS—SHEET 1.

Witnesses:

Inventor
Percy B. Dawson
By his Attorneys
Rosenbaum & Stockbridge

P. B. DAWSON.
VEHICLE TIRE.
APPLICATION FILED NOV. 22, 1911.
1,089,116.
Patented Mar. 3, 1914.
2 SHEETS—SHEET 2.
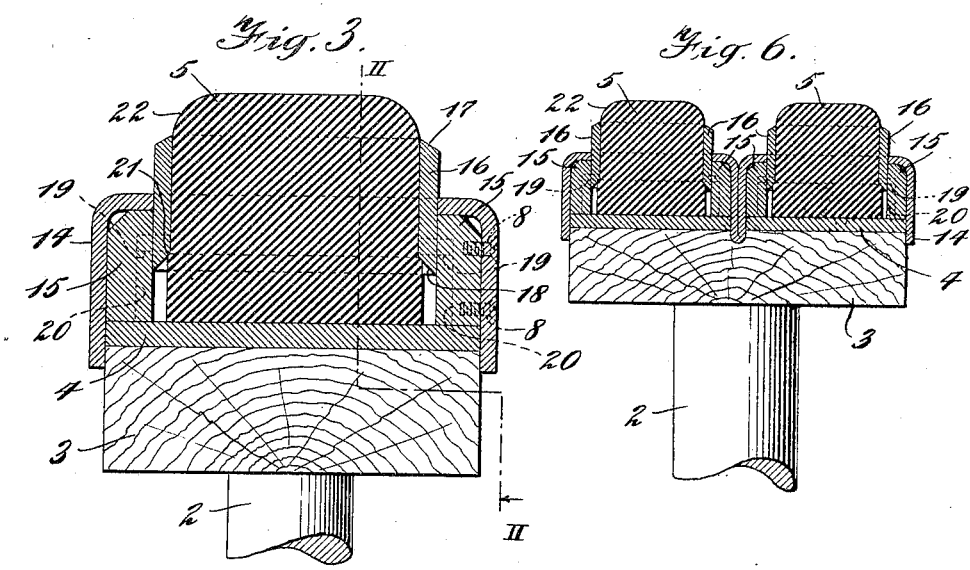
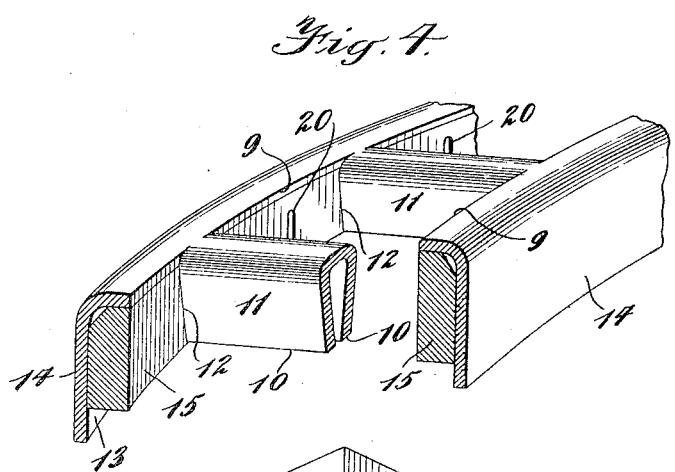
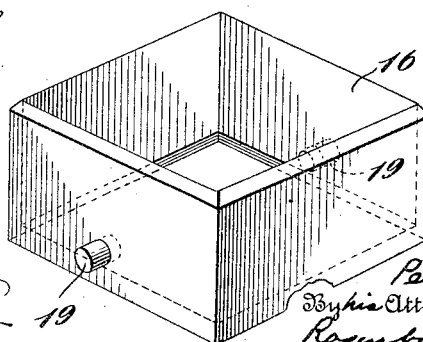
Witnesses:
Inventor
Percy B. Dawson.
By his Attorneys

UNITED STATES PATENT OFFICE.

PERCY B. DAWSON, OF BERKELEY, CALIFORNIA.

VEHICLE-TIRE.

1,089,116. Specification of Letters Patent. Patented Mar. 3, 1914.

Application filed November 22, 1911. Serial No. 661,703.

*To all whom it may concern:*

Be it known that I, PERCY B. DAWSON, a citizen of the United States, residing at Berkeley, in the county of Alameda and State of California, have invented certain new and useful Improvements in Vehicle-Tires, of which the following is a full, clear, and exact description.

This invention relates to vehicle tires and more particularly to tires used upon automobile trucks, and the like.

Tires intended for service on merchandise trucks are usually made of solid rubber and are hence very expensive. The life of rubber tires subjected to such heavy loads as are carried by these trucks, is short, and it is extremely desirable that some construction be provided which shall possess the advantages residing in a solid rubber tire, *i. e.*, easy riding qualities, smooth running, etc., and which shall in addition be, if anything, even more highly resilient, and, what is of even more importance, of greater durability.

To form such a tire has been the principal object of the present invention; but certain other advantages, which will be hereinafter noted, are afforded by the novel construction herein set forth.

I am aware that many modifications of my device may be made within the purview of my invention, and hence desire to be limited only by the scope of the claims appended hereto.

In the drawings which form a part hereof and in which like reference characters designate like parts throughout the several views, I have illustrated certain preferred forms of my tire.

Figure 2:
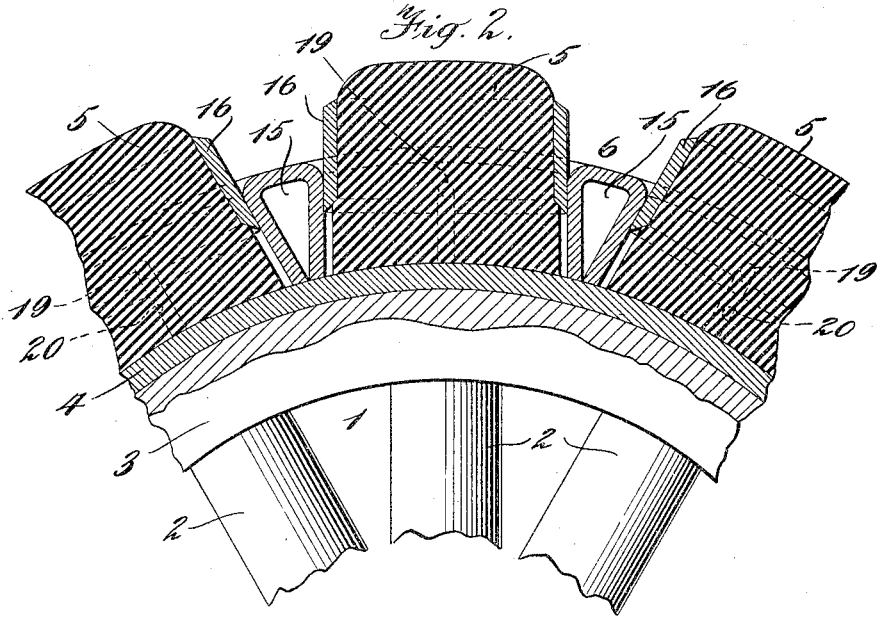

Figure 1 is a side elevation of a wheel with my novel tire thereon. Fig. 2 is a detail section of a portion of said tire, taken on line II—II of Fig. 3. Fig. 3 is a transverse section of the wheel rim with tire thereon. Fig. 4 is a detail of construction showing the preferred form of rim. Fig. 5 is a perspective view of one of the cushion casings. Fig. 6 is a view similar to that shown in Fig. 3, of a modified form of the device.

The wheel broadly designated 1, which may have the usual spokes 2 and felly or wooden rim 3 is provided with a felly-band 4, preferably of steel, which forms a seat for the rubber cushions 5 and retaining rim broadly designated 6, within which said cushions are disposed. The rim 6 is preferably formed of suitable metal, such as sheet steel, and in the form of device exemplified in Figs. 1 and 3, consists of several arcuate sections or frames 7, which may be held in place in any suitable manner, as by means of bolts or screws 8. Each of these sections, in cross section, has substantially the form of an inverted U, but the horizontal portion of the U is cut or slit as at 9 and the slitted metal or bridge between the slitting lines 9 which are parallel to the sides of the rim, is severed transversely at the center thereof and bent downwardly so that the severed edges 10 are directed substantially toward the center of the wheel. As viewed in Fig. 4 the cross-bars 11, so formed, have practically the shape, in cross-section, of horseshoe magnets. Between the edges 12 of these cross-bars and the respective inner walls 13 of the vertical sides 14 of the rim, are disposed rings 15; one of said rings being adjacent either edge of the felly-band 4. The formation of the cross-bars 11 is such as to effectively maintain these rings in position and to render the structure as a whole extremely rigid.

By forming the rim in the manner described a series of pockets are provided therein which are preferably substantially square and are adapted for the reception of the cushion casings 16. Laterally, of course, these casings bear against the in-turned edges of the rim, formed by the slits 9 previously referred to, and the inner and opposed surfaces of the respective rings 15. Each casing 16 is preferably frame-like in contour, being open both top and bottom, and the upper edge 17 thereof is tapered inwardly, while the bottom edge 18 preferably tapers or flares outwardly.

Since the opposed sides of a casing are in parallelism and neatly engage the walls of the pocket within which it is disposed in the rim, it is essential that some means be provided for retaining said casing in place is such pocket. The means which I prefer for this purpose are simple pins 19, two of which may be provided in connection with each casing, in opposite sides thereof; these pins being driven or otherwise secured firmly in the walls of the casing and projecting outwardly therefrom a short distance. The projecting portions ride in slots 20 formed in the inner wall of each of the rings 15, said slots extending, in the exemplification shown, from the inner annular surface of the rings radially outward toward, but not quite as far as, the outer annular surface of the same.

Within the casings are located the blocks or cushions 5, previously referred to. I prefer to make these of some highly resilient material; preferably a good grade of rubber. These blocks may be square in cross-section, and are provided with a ridge 21 therearound adapted for engagement with the inner edge of the casing 16. In the form of device shown, this ridge has been formed by merely extending the base of the block or cushion slightly beyond the body thereof, all around. The upper surface of the block may have its edges rounded as at 22, and it should be noted that the casing 16 extends well up toward this upper surface affording protection for the sides of the block or cushion and preventing inadvertent laceration, or wear, of said sides.

If desired, the rim may be formed in the manner illustrated in Fig. 6, wherein a double row of pockets is provided; each pocket, of course, being adapted for the reception of its resilient cushion and the protective supporting casing therearound, in substantially the same fashion as in the case just described.

The operation of the device is as follows: Assuming that a truck has been provided with tires constructed in accordance with the principles of my invention, and that the said truck has been heavily laden. Those cushions 5 which are not in contact with the ground will protrude out through the rim to substantially the full extent to which they may extend. In so doing, casings 16 therearound will correspondingly have been driven to their outermost positions, since the pins 19 are so disposed with respect to the surfaces 18 of these casings and to the ridges 21 of the blocks, that the said pins will have been forced outwardly to the outer ends of the slots 20 when the rubber blocks have been allowed to expand fully. When, however, the truck advances and by the rotation of the wheels successive cushions are caused to engage the ground, the outer surfaces of said cushions will be driven inwardly toward the center of the wheel. In so doing the material throughout the block will be compressed to a greater or less extent, and the inner portion of a block under compression will have the sides thereof adjacent its inner edges outwardly or laterally bulged into the space adjacent the edge 18 of the casing of said block. It is on account of this action that the lower edge 18 of the casing is preferably flared in the manner described, since this formation tends to conserve the life of the block. As the block is in close frictional engagement with the casing 16, and as by reason of the compression to which it is thus subjected, it is driven still more closely into engagement with its casing, it tends to carry the casing inwardly toward the center of the wheel along with it when said block is compressed in the manner described. The casing 16 moves guidedly therefore down into its pocket, and since it is guided by the walls of the pocket, and since it is firmly in engagement with the lateral walls of the rubber block, the said block is free to move only along the radial line in the manner described, and cannot become distorted laterally, nor bent over. Immediately after pressure is relieved upon the outer surface of the cushion, the inherent resiliency of the latter forces said surface outwardly to the extent of its travel; casing 16 moving along with it toward and into its outermost position.

On account of this construction practically the only wear to which the block is subjected is upon its exposed outer surface, and since this wear is not of such a nature, under the conditions imposed, as will tend to tear the elastic material, and is only such as will occur from the mere rolling contact of the surface with the ground, it is obvious that the life of a resilient block, such as I have shown, is materially prolonged by providing such a protecting casing or frame therearound. Furthermore, by reason of the fact that the bottoms of the blocks are free to expand laterally upon all sides, the said blocks form cushions which are even preferable to solid rubber tires, which can only expand laterally on the respective opposed arcuate sides.

By making the casing in one piece the likelihood of fracture thereof is practically obviated. There are, too, it will be observed, no small parts to become loose since the pins 19 which are preferably welded into the casing, cannot under any circumstances slip outwardly therefrom owing to the fact that they ride in the three-walled slots 20; while the rubber cushions themselves cannot inadvertently become displaced, even though no bolts or wires have been passed therethrough, owing to the ridging of the walls thereof. The rings 15 perform the dual function of providing lateral guides for the casings, and of stiffening the rim as a whole.

Having described my invention, I claim:

1. In a vehicle tire, the combination of a rim frame comprising two opposed rings connected together by cross bars thereby forming a series of pockets, stiffening rings secured to each of said opposed rings and forming part of the walls of said pockets, said stiffening rings having radial grooves therein and cushion carrying frames located in said pockets and provided with pins projecting into said grooves whereby the movements of the cushion carrying frames are guided and limited.

2. In a vehicle tire a sheet metal rim frame comprising two spaced apart rings and integral cross bars forming a series of pockets, said cross bars being partially cut from the rings and bent so that their cross-section is U-shaped, in combination with a series of cushions located in the respective pockets.

3. In a vehicle tire, a sheet metal annular frame comprising top and side portions, said top portions being cut adjacent the side portions and the metal bent to a U-shape to form spaced-apart rings and cross-bars integral therewith, stiffening rings fastened between said rings and the ends of the cross-bars, the inner walls of said stiffening rings and the walls of said cross-bars forming pockets in combination with a series of cushions located in the respective pockets.

In witness whereof, I subscribe my signature, in the presence of two witnesses.

PERCY B. DAWSON.

Witnesses:
 FRED A. NASSIE,
 FRED C. GLEED.

Copies of this patent may be obtained for five cents each, by addressing the "Commissioner of Patents, Washington, D. C."